(12) United States Patent  
Cho et al.

(10) Patent No.: US 9,030,381 B2  
(45) Date of Patent: May 12, 2015

(54) PARALLAX BARRIER PANEL AND DISPLAY APPARATUS HAVING THE SAME

(75) Inventors: Jung-Hyun Cho, Suwon-si (KR); Moon-Jung Baek, Suwon-si (KR); Seong-Mo Hwang, Seongnam-si (KR); Moon-Gyu Lee, Suwon-si (KR); Sang-Il Kim, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 303 days.

(21) Appl. No.: 13/540,058

(22) Filed: Jul. 2, 2012

(65) Prior Publication Data  
US 2013/0162610 A1 Jun. 27, 2013

(30) Foreign Application Priority Data  
Dec. 22, 2011 (KR) .................. 10-2011-0139956

(51) Int. Cl.  
H04N 13/00 (2006.01)  
G02B 26/02 (2006.01)  
G09G 5/10 (2006.01)  
G02B 26/00 (2006.01)  
G09G 3/00 (2006.01)  
H04N 13/04 (2006.01)  
G09G 3/34 (2006.01)

(52) U.S. Cl.  
CPC .............. *G09G 5/10* (2013.01); *G02B 26/005* (2013.01); *G09G 3/003* (2013.01); *H04N 13/0413* (2013.01); *G09G 3/3433* (2013.01)

(58) Field of Classification Search  
USPC .................. 359/655, 228; 349/15; 345/6  
See application file for complete search history.

(56) References Cited  
U.S. PATENT DOCUMENTS

| 5,315,377 A * | 5/1994 | Isono et al. .................. 348/51 |
| 6,023,277 A * | 2/2000 | Osaka et al. ................. 345/419 |
| 7,307,672 B2 * | 12/2007 | Feenstra et al. ............... 349/15 |
| 2002/0196558 A1 * | 12/2002 | Kroupenkine et al. ....... 359/665 |

(Continued)

FOREIGN PATENT DOCUMENTS

| KR | 08-076058 | 3/1996 |
| KR | 10-2007-0097815 | 10/2007 |

OTHER PUBLICATIONS

Specific Gravity Table downloaded Jun. 26, 2014, from http://www.engineeringtoolbox.com/specific-gravity-liquids-d_336.html, 2 pages.*

(Continued)

*Primary Examiner* — Dorothy Harris  
(74) *Attorney, Agent, or Firm* — F.Chau & Associates, LLC

(57) ABSTRACT

A parallax barrier panel includes a first and second substrate and a fluidic layer disposed therebetween. The first substrate includes first electrode parts, a water-repellent layer and a partition wall. Each of the first electrode parts includes a main electrode and a first notch electrode and a second notch electrode. The main electrode extends in a first direction on a first base substrate. The first and second notch electrodes are adjacent to respective ends of the main electrode. The first and second notch electrodes extend along the main electrode in the first direction. The second substrate includes a second electrode part and a second base substrate, the second electrode part being disposed on the second base substrate. The second base substrate is disposed opposite to the first base substrate. The fluidic layer controls a light transmittance according to a voltage difference between the first and second electrode parts.

17 Claims, 10 Drawing Sheets

(56) References Cited

U.S. PATENT DOCUMENTS

| | | | | |
|---|---|---|---|---|
| 2003/0006140 A1* | 1/2003 | Vacca et al. | | 204/547 |
| 2004/0057111 A1* | 3/2004 | Dominguez Motntes | | 359/462 |
| 2005/0253779 A1* | 11/2005 | Feenstra et al. | | 345/6 |
| 2006/0098281 A1* | 5/2006 | Fukushima et al. | | 359/464 |
| 2006/0227323 A1* | 10/2006 | Goto | | 356/336 |
| 2007/0070489 A1* | 3/2007 | Verhaegh et al. | | 359/265 |
| 2008/0100922 A1* | 5/2008 | Choi et al. | | 359/665 |
| 2008/0151346 A1* | 6/2008 | Hsiao | | 359/228 |
| 2008/0278808 A1* | 11/2008 | Redert | | 359/478 |
| 2009/0059348 A1* | 3/2009 | Niwano et al. | | 359/296 |
| 2009/0122417 A1* | 5/2009 | Hou | | 359/665 |
| 2009/0207622 A1* | 8/2009 | Tsuboi et al. | | 362/331 |
| 2009/0257111 A1* | 10/2009 | Heikenfeld et al. | | 359/295 |
| 2009/0268303 A1* | 10/2009 | Takai | | 359/626 |
| 2010/0053717 A1* | 3/2010 | Takahashi | | 359/228 |
| 2010/0302349 A1 | 12/2010 | Huang et al. | | |
| 2011/0006979 A1* | 1/2011 | Min et al. | | 345/156 |
| 2011/0140996 A1* | 6/2011 | Parry-Jones | | 345/60 |
| 2011/0157711 A1* | 6/2011 | Tsuji et al. | | 359/665 |
| 2012/0026568 A1* | 2/2012 | Takahashi | | 359/226.3 |
| 2012/0154886 A1* | 6/2012 | Heikenfeld et al. | | 359/228 |
| 2012/0168309 A1* | 7/2012 | Heikenfeld et al. | | 204/518 |
| 2012/0208425 A1* | 8/2012 | Campisi et al. | | 445/24 |
| 2013/0148045 A1* | 6/2013 | Ohyama et al. | | 349/15 |

OTHER PUBLICATIONS

Sodium Chloride Brine Tables downloaded Jun. 26, 2014 from http://www.alkar.com/download/pdf/Sodium%20Chloride%20Brine%20Tables%20for%2060F.pdf, 2 pages.*

Define trackable downloaded Jun. 26, 2014 from http://www.thefreedictionary.com/trackable, 3 pages.*

English Abstract for Publication No. 10-2007-0097815.

English Abstract for Publication No. 08-076058.

* cited by examiner

PARALLAX BARRIER PANEL AND DISPLAY APPARATUS HAVING THE SAME

CROSS-REFERENCE TO RELATED APPLICATION

This application claims priority under 35 U.S.C. §119 to Korean Patent Application No. 10-2011-0139956, filed on Dec. 22, 2011 in the Korean Intellectual Property Office (KIPO), the contents of which are herein incorporated by reference in their entirety.

BACKGROUND

1. Technical Field

Exemplary embodiments of the present invention relate to a parallax barrier panel and a display apparatus having the parallax barrier panel. More particularly, exemplary embodiments of the present invention relate to a parallax barrier panel selectively displaying a 2-dimensional (2D) image and a 3-dimensional (3D) stereoscopic image and a display apparatus having the parallax barrier panel.

2. Description of Related Art

In general, three dimensional (3D) image display technology creates a stereoscopic effect using the concept of binocular parallax or binocular disparity. Binocular parallax uses a difference in an object's location as seen from two different points (e.g., two different lens or a viewer's eyes) to create the stereoscopic effect. The binocular parallax is an important factor for achieving the stereoscopic effect at a short distance.

Generally, a display apparatus capable of displaying a stereoscopic image displays the stereoscopic image using the binocular parallax. In the display apparatus, as long as a parallax barrier or lens is disposed on a display panel, a viewer cannot view a 2D image.

SUMMARY

According to an exemplary embodiment of the present invention, a parallax barrier panel includes a first substrate, a second substrate and a fluidic layer. The first substrate includes a plurality of first electrode parts, a water-repellent layer and a partition wall. Each of the first electrode parts includes a main electrode and a first notch electrode and a second notch electrode. The main electrode extends in a first direction on a first base substrate. The first and second notch electrodes are adjacent to respective ends of the main electrode. The first and second notch electrodes extend along the main electrode in the first direction. The water-repellent layer is disposed on the first electrode parts. The partition wall is disposed on the water-repellent layer. The second substrate includes a second electrode part and a second base substrate, the second electrode part being disposed on the second base substrate. The second base substrate is disposed opposite to the first base substrate. The fluidic layer is disposed between the first substrate and the second substrate. The fluidic layer controls a light transmittance according to a voltage difference between the first electrode parts and the second electrode part.

In an exemplary embodiment, the first substrate may further include a plurality of third electrode parts insulated from the first electrode parts and disposed between the first base substrate and the first electrode parts. Each third electrode part may include a crossing electrode, a third notch electrode and a fourth notch electrode. The crossing electrodes may extend in a second direction different from the first direction. The third and fourth notch electrodes may be adjacent to respective ends of the crossing electrode respectively. The third and fourth notch electrodes may extend along the crossing electrode in the second direction.

In an exemplary embodiment, a width of the crossing electrode may be greater than or substantially equal to a width of the main electrode.

In an exemplary embodiment, the fluidic layer may include a first fluid and a second fluid. The first fluid may be disposed in a space divided by the partition wall. The first fluid may make contact with the water-repellent layer. The second fluid may be filled between the first substrate and the second substrate. The second fluid may have a specific gravity different from the first fluid.

In an exemplary embodiment, the second substrate may further include a passivation layer disposed on the second electrode and an opposite partition wall disposed on the passivation layer, the opposite partition wall disposed corresponding to the partition wall. The fluidic layer may further include a third fluid disposed in an opposite space divided by the opposite partition wall. The third fluid may make contact with the passivation layer.

In an exemplary embodiment, the first fluid may be a reflective oil for reflecting incident light. The third fluid may be an absorbing oil for absorbing the incident light.

In an exemplary embodiment, signals may be provided to the main electrode, the first notch electrode and the second notch electrode, respectively.

In an exemplary embodiment, a barrier structure is formed of the fluidic layer, wherein the barrier structure is trackable along a second direction crossing the first direction.

In an exemplary embodiment, the partition wall may extend in the first direction. The partition wall may include a plurality of opening parts arranged in a second direction different from the first direction. The first electrode parts may correspond to the opening parts respectively.

In an exemplary embodiment, the partition wall may include a plurality of opening parts arranged in the first direction and a second direction different from the first direction. Each first electrode part may correspond to a group of the opening parts arranged in the first direction.

According to an exemplary embodiment of the present invention, a display apparatus includes a display panel and a parallax barrier panel. The parallax barrier panel includes a first substrate, a second substrate and a fluidic layer. The first substrate includes a plurality of first electrode parts, a water-repellent layer and a partition wall. Each of the first electrode parts includes a main electrode extended in a first direction on a first base substrate and a first notch electrode and a second notch electrode disposed adjacent to respective ends of the main electrode and extending along the main electrode in the first direction. The water-repellent layer is disposed on the first electrode parts. The partition wall is formed on the water-repellent layer. The second substrate faces the first substrate. The second substrate includes a second electrode part. The fluidic layer is disposed between the first substrate and the second substrate. The fluidic layer controls a light transmittance according a voltage difference between the first electrode part and the second electrode part.

In an exemplary embodiment, the first substrate may further include a crossing electrode, a third notch electrode and a fourth notch electrode. The crossing electrode may be insulated from the first electrode parts, and disposed between the first electrode parts and the first base substrate. The crossing electrode may be extended in a second direction different from the first direction. The third and fourth notch electrodes may be disposed adjacent to respective ends of the crossing electrode. The third and fourth notch electrodes may be extended in the second direction.

In an exemplary embodiment, each first electrode may correspond to at least one unit pixel arranged in the second direction of the display panel. The first electrode may extend in the first direction. Each third electrode may correspond to one unit pixel arranged in the first direction. The third electrode may extend in the second direction.

In an exemplary embodiment, the display panel may include a liquid crystal display panel, and the parallax barrier panel may be disposed on or under the display panel.

In an exemplary embodiment, the display panel may include an electroluminescence display panel, and the parallax barrier panel may be disposed on the display panel.

In an exemplary embodiment, the fluid layer may include a first fluid and a second fluid. The first fluid may be disposed in a space formed by the partition wall. The first fluid may make contact with the water-repellent layer. The second fluid may be filled between the first substrate and the second substrate. The second fluid may have specific gravity different from the first fluid.

In an exemplary embodiment, the second substrate may further include a passivation layer formed on the second electrode and an opposite partition wall formed on the passivation layer and corresponding to the partition wall. The fluidic layer may further include a third fluid including an absorbing oil in a space divided by the opposite partition wall. The absorbing oil may make contact with the passivation layer. The first fluid may include a reflective oil.

In an exemplary embodiment, the display apparatus may further include a light providing unit providing light to the display panel. The parallax barrier panel may be disposed between the display panel and the light providing unit.

In an exemplary embodiment, the parallax barrier panel forms a barrier structure of the fluidic layer, wherein the barrier structure is trackable along a second direction crossing the first direction.

In an exemplary embodiment, the partition wall may extend in the first direction, and include a plurality opening parts arranged in a second direction crossing the first direction. The first electrode parts may correspond to the opening parts respectively.

According to an exemplary embodiment of the present invention, a method is described for controlling a barrier structure of parallax barrier panel comprising a fluidic layer disposed between a first substrate and a second substrate, the fluidic layer controlling a light transmittance according to a voltage difference between a plurality of first electrode parts of the first substrate and a second electrode part of the second substrate, the method comprising changing a first voltage applied at a first time to a first notch electrode and a first main electrode of a first area electrode of the first electrode parts to a second voltage applied at a second time, applying the first voltage during the first time and the second time to a second notch electrode of the first area electrode, wherein the first and second notch electrodes are adjacent to respective ends of the first main electrode and extend along the ends of the first main electrode in a first direction, applying the first voltage during the first time and the second time to a third notch electrode of a second area electrode of the first electrode parts adjacent to the first area electrode in a second direction different than the first direction, and changing the second voltage applied at the first time to a second main electrode and a fourth notch electrode of the second area electrode to the first voltage applied at the second time, wherein the third and fourth notch electrodes of the second area electrode are adjacent to respective ends of the second main electrode of the second area electrode and extend along the ends of the second main electrode in the first direction.

In an exemplary embodiment, a first fluid of the fluidic layer covers the first area electrode at the first time and exposes a portion of the first area electrode at the second time, and wherein the first fluid spreads to cover a portion of the second area electrode at the second time.

According to an exemplary embodiment of the present invention, in a parallax barrier panel and a display apparatus having the same, a parallax barrier structure used in a 3-dimensional (3D) stereoscopic image mode may be embodied using an electro wetting device. In a 2-dimensional (2D) image mode, a voltage applied to one of two notch electrodes is 0V, and a voltage applied to a main electrode and another of two notch electrode is a maximum voltage, so that the 2D image may be displayed.

In addition, a light transmitting area and a light blocking area the parallax barrier panel according to an exemplary embodiment of the present invention are formed based on the movement of the fluid of the fluidic layer. Thus, the parallax barrier panel according to an exemplary embodiment of the present invention may position-track according to a viewpoint of a viewer.

BRIEF DESCRIPTION OF THE DRAWINGS

Exemplary embodiments of the present invention will become more apparent with reference to the accompanying drawings, in which.

DETAILED DESCRIPTION OF EXEMPLARY EMBODIMENTS

Exemplary embodiments of the present invention will be explained in detail with reference to the accompanying drawings.

Figure 1:
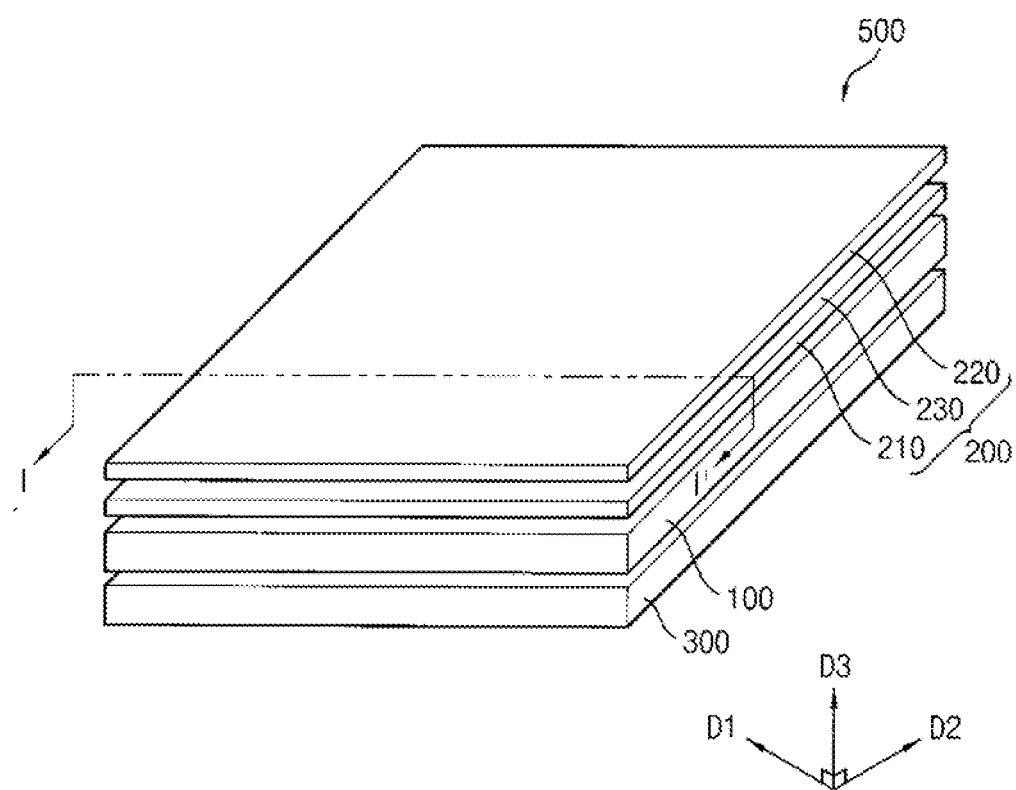
FIG. 1 is a perspective view illustrating a display apparatus according to an exemplary embodiment of the present invention.
Figure 2A:
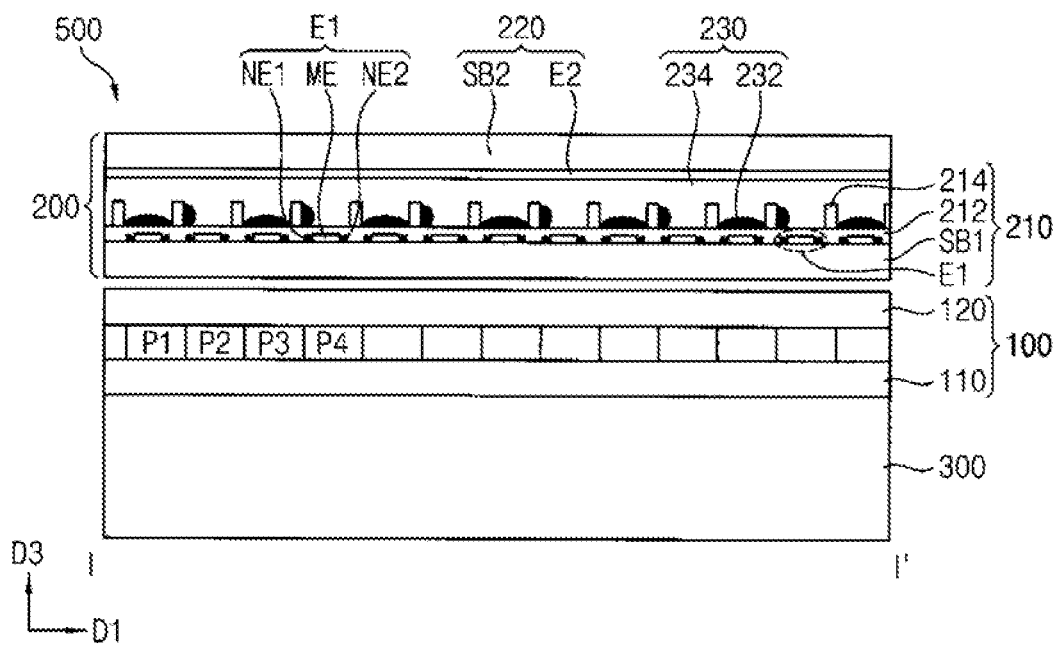
FIG. 2A is a cross-sectional view illustrating a display apparatus in a 3-dimensional (3D) stereoscopic image mode view taken along a line I-I' of FIG. 1.

FIG. 1 is a perspective view illustrating a display apparatus according to an exemplary embodiment of the present invention. FIG. 2A is a cross-sectional view illustrating a display apparatus in a 3-dimensional (3D) stereoscopic image mode taken along a line I-I' of FIG. 1.

Referring to FIG. 1 and FIG. 2A, a display apparatus 500 includes a display panel 100, a parallax barrier panel 200 disposed on the display panel 100, and a light providing unit 300 disposed under the display panel 100.

The display panel 100 selectably displays a 2-dimensional (2D) image or a 3-dimensional (3D) stereoscopic image. The display panel 100 includes a plurality of unit pixels P1, P2, P3 and P4. The display panel 100 includes a first display substrate 110 and a second display substrate 120. The unit pixels P1, P2, P3 and P4 are defined by the first and second display substrates 110 and 120. The second, third and fourth unit pixels P2, P3 and P4 are arranged in a first direction with respect to the first unit pixel P1. Additional unit pixels are arranged in a second direction different from the first direction D1 with respect to the first, second, third and fourth unit pixels P1, P2, P3 and P4.

The display panel 100 may be a liquid crystal display panel including a liquid crystal layer. The liquid crystal layer is disposed between the first display substrate 110 and the second display substrate 120. The first display substrate 110 may include a thin film transistor, which is a switching element, and a pixel electrode connected to the thin film transistor. The second display substrate 120 may include a common electrode and one or more color filters. Alternatively, at least one of the common electrode and the color filter may be included in the first display substrate 110. Each of the unit pixels P1, P2, P3 and P4 may include the thin film transistor, the pixel electrode, the color filter, the common electrode and the liquid crystal layer. In FIG. 1 and FIG. 2A, a pixel of the display panel 100 is a unit pixel.

In FIG. 1 and FIG. 2A, the parallax barrier panel 200 is disposed on the display panel 100. The parallax barrier panel 200 may be disposed between the display panel 100 and the light providing unit 300.

The parallax barrier panel 200 includes a first substrate 210, a second substrate 220 and a fluidic layer 230 disposed between the first substrate 210 and the second substrate 220.

The first substrate 210 is disposed on the display panel 100. For example, the first display substrate 110 is disposed on the second display substrate 120. The first substrate 210 includes a first base substrate SB1, a plurality of first electrode parts E1, a water-repellent layer 212 and a partition wall 214.

Each of the first electrode parts E1 includes a main electrode ME, a first notch electrode NE1 and a second notch electrode NE2. The first and second notch electrodes NE1 and NE2 are disposed adjacent to both ends of the main electrode ME, and spaced apart from the main electrode ME. The first electrode parts E1 may correspond to unit pixels of the display panel 100 including the first, second, third and fourth unit pixels P1, P2, P3 and P4, respectively. The first electrode parts E1 may include transparent conductive oxide (TCO). For example, the first electrode parts E1 may include indium zinc oxide (IZO), indium tin oxide (ITO), etc.

Signals, independent from each other, may be applied to the main electrode ME, the first notch electrode NE1 and the second notch electrode NE2 of a first electrode part E1, respectively.

The water-repellent layer 212 is formed on the first base substrate SB1 and the first electrode parts E1. The water-repellent layer 212 may be a hydrophobic insulating layer.

The partition wall 214 is formed on the water-repellent layer 212. The partition wall 214 may be disposed between adjacent first electrodes E1. The partition wall 214 exposes portions of the water-repellent layer 212 overlapping with the first electrode parts E1.

The second substrate 220 includes a second base substrate SB2 facing the first base substrate SB1 and a second electrode part E2. The second electrode part E2 may include ITO, IZO, etc., which is substantially the same as the material included in the first electrode part E1. The second electrode part E2 may be entirely formed on the second base substrate SB2. Alternatively, the second electrode part E2 may extend in the first direction D1, and may include a plurality of line electrodes spaced apart from each other. The line electrodes may be disposed on the second base substrate SB2, and arranged in the second direction at a regular interval.

The fluidic layer 230 includes a first fluid 232 and a second fluid 234. The first and second fluids 232 and 234 may have specific gravities different from each other.

The first fluid 232 is disposed in one or more spaces formed by the partition wall 214, and makes contact with the water-repellent layer 212. The first fluid 232 may spread according to voltages applied to the first and second electrodes E1 and E2, so that the first fluid 232 covers the water-repellent layer 212 in the space formed by the partition wall 214, or the first fluid 232 may move toward the partition wall 214. The first fluid 232 may have a color and be hydrophobic. For example, the first fluid 232 may be a black oil. The first fluid 232 may be a light absorbing oil.

The second fluid 234 is disposed in a space between the first substrate 210 and the second substrate 220. The second fluid 234 is an electrolyte layer. For example, a remaining space excepting the space filled with the first fluid 232 may be filled with the second fluid 234. The second fluid 234 may have a polarity different from the first fluid 232, and have specific gravity different from the first fluid 232. For example, the second fluid 234 may have specific gravity less than the first fluid 232, and may be hydrophilic. The second fluid 234 may be water.

Hereinafter, referring to FIGS. 2B, 3A and 3B, structures of the first electrode parts E1 and the partition wall 214 are explained in detail.

Figure 2B:
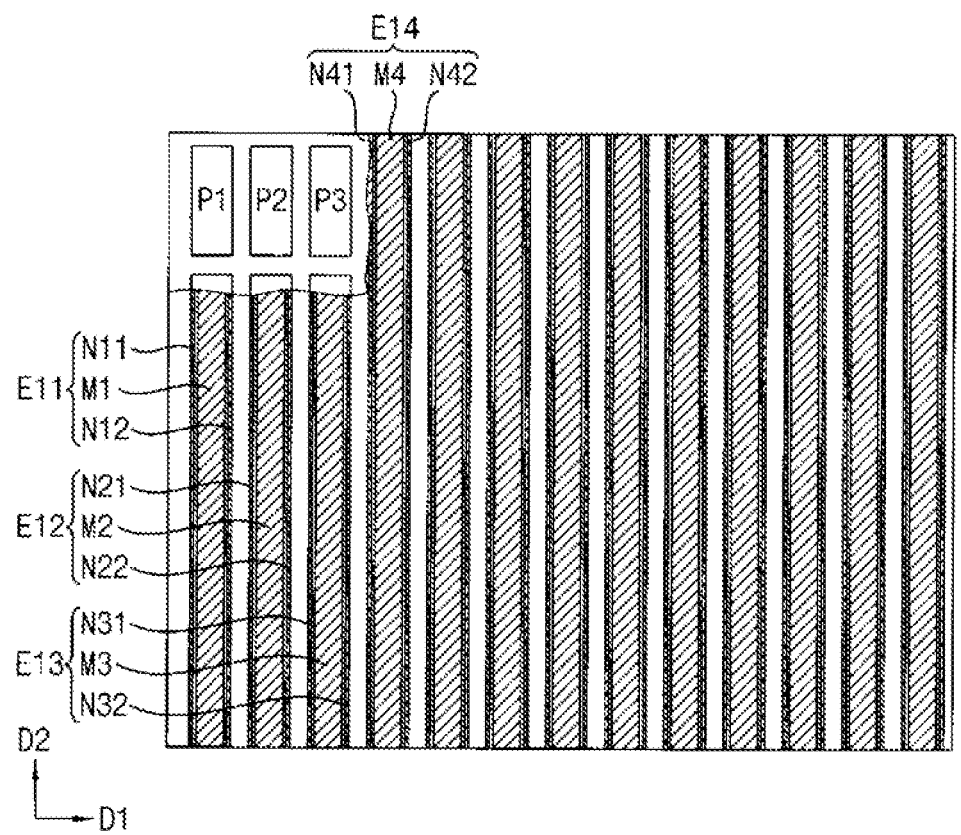
FIG. 2B is a plan view illustrating a first electrode part of FIG. 2A.

FIG. 2B is a plan view illustrating a first electrode part of FIG. 2A.

Referring to FIG. 2B, the first electrode parts E1 extend in the second direction D2. Hereinafter, the first electrode parts E1 includes a first area electrode E11, a second area electrode E12, a third area electrode E13 and a fourth area electrode E14.

The first area electrode E11 corresponds to the first unit pixel P1 and the unit pixels arranged in the second direction D2 for the first unit pixel P1. The second area electrode E12 corresponds to the second unit pixel P2 and the unit pixels arranged in the second direction D2 for the second unit pixel P2. In addition, the third area electrode E13 and the fourth area electrode E14 correspond to the third unit pixel P3 and the fourth unit pixel P4, respectively. The main electrodes of the first, second, third and fourth area electrodes E11, E12, E13 and E14 correspond to a first, second, third and fourth main electrodes M1, M2, M3 and M4, respectively.

The first and second notch electrodes N11 and N12 of the first area electrode E11 are disposed adjacent to both ends of the first main electrode M1. The first and second notch electrodes N11 and N12 of the first area electrode E11 may receive signals separate from each other, and the first main electrode M1 may receive a signal separate from the signals applied to the first and second notch electrodes N11 and N12. The first and second notch electrode N21 and N22 of the second area electrode E12 are disposed adjacent to both ends of the second main electrode M2. The first notch electrode N21 of the second area electrode E12 may be disposed adjacent to the second notch electrode N12 of the first area electrode E11 in the first direction D1. In addition, the first and second notch electrodes N31 and N32 of the second area electrode E13 are disposed adjacent to both ends of the third main electrode M3, and the first and second notch electrodes N41 and N42 of the fourth area electrode E14 are disposed adjacent to both ends of the fourth main electrode M4.

The first, second, third and fourth area electrodes E11, E12, E13 and E14 may receive signals separate from each other, respectively. For example, the first, second, third and fourth main electrodes M1, M2, M3 and M4 are connected to signal lines different from each other, and the first, second, third and fourth main electrodes M1, M2, M3 and M4 may receive signals separate from each other, respectively. The first notch electrodes N11, N21. N31 and N41 of the first, second, third and fourth area electrodes E11, E12, E13 and 314 may be connected to signal lines different from each other, respectively, and the second notch electrodes N12, N22, N32 and N42 of the first, second, third and fourth area electrodes E11, E12, E13 and 314 may be connected to signal lines different from each other, respectively.

Alternatively, the first electrode parts E1 may include even column and odd column, and the even column may receive a signal separate from a signal applied to the odd column. For example, the second and fourth main electrodes M2 and M4, which are main electrodes ME of the even columns, may be connected to a same signal line to receive a same signal. In addition, the first notch electrodes N21 and N41 of the second and fourth area electrodes E12 and E14 of the even columns may be connected to a same signal line to receive a same signal, and the second notch electrodes N22 and N42 of the second and fourth area electrodes E12 and E14 of the even columns may be connected to a same signal line to receives a same signal. The first and third main electrodes M1 and M3, which are the main electrodes ME of the odd columns, are connected to a same signal line to receive a same signal. In addition, the first notch electrodes N11 and N13 of the first and third area electrodes E11 and E13 of the odd columns may be connected to a same signal line to receive a same signal line, and the second notch electrodes N21 and N33 may be connected to a same signal line receive a same signal.

Figure 3A:
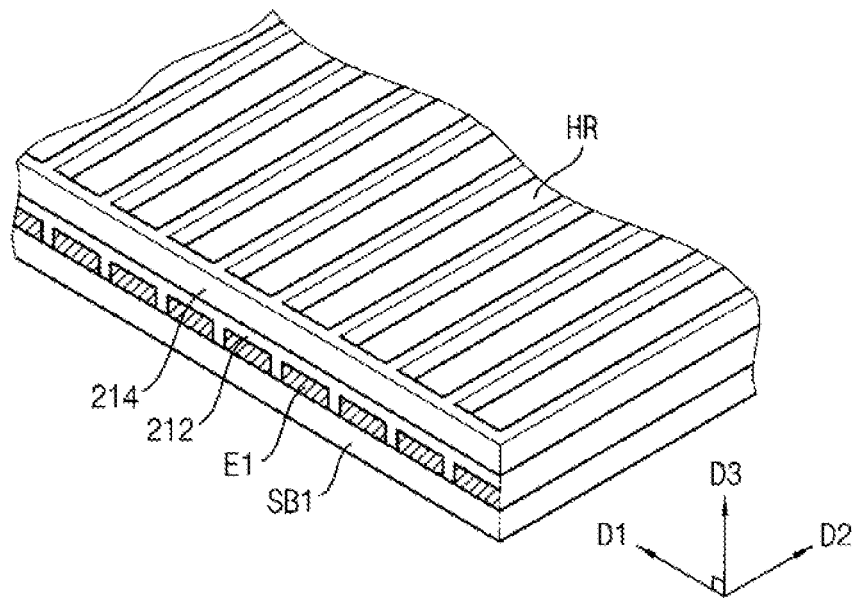
FIGS. 3A and 3B are perspective views illustrating a partition wall of FIG. 2A.
Figure 3B:
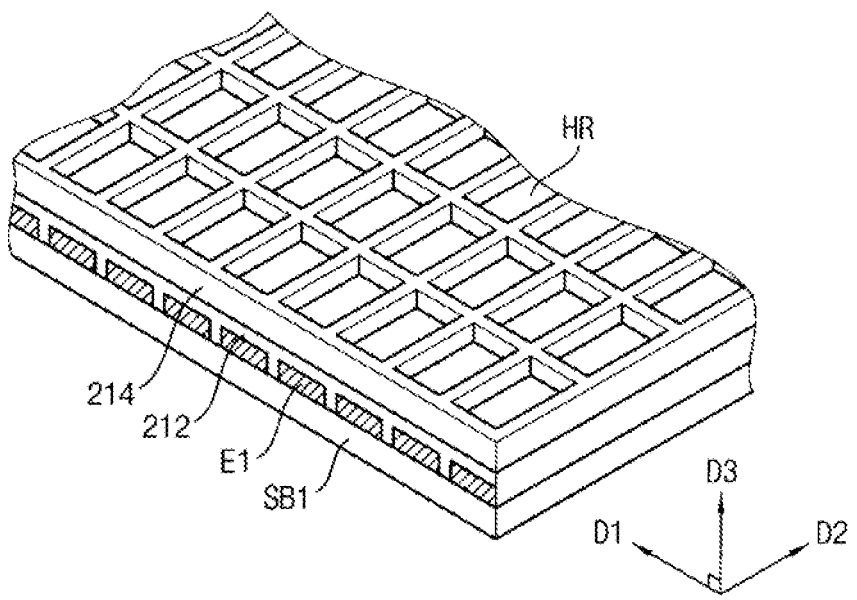

FIGS. 3A and 3B are perspective views illustrating a partition wall of FIG. 2A.

Referring to FIG. 3A, receiving spaces of the first fluid 232 may be opening parts HR extended in the second direction D2. The opening parts HR may be formed by the partition wall 214. That is, each opening part HR has a linear shape extended in the second direction D2. The opening parts HR are spaced apart from each other. The first electrode parts E1 may correspond to the opening parts HR. The opening part HR corresponding to the first area electrode E11 may correspond to the first unit pixel P1 and the unit pixels arranged in the second direction D2 for the first unit pixel P1.

Alternatively, referring to FIG. 3B, the receiving space of the first fluid 232 may be opening parts HR arranged in a matrix shape. The opening parts HR may be formed by the partition wall 214. The opening parts HR may have substantially same shapes as the first, second, third and fourth unit pixels P1, P2, P3 and P4, respectively. The opening parts HR correspond to the first, second, third and fourth unit pixels P1, P2, P3 and P4, and the first fluid 232 may be disposed in the opening parts HR. Each first electrode part E1 extends in the second direction D2, so that the first fluid 232 on the unit pixels corresponding to the first electrode part E1 moves together.

Referring to FIG. 2A again, light transmittance may be controlled by the fluidic layer 230. For example, a voltage applied to the first notch electrode NE1 is substantially same as the common voltage applied to the second electrode part E2, so that there is no voltage difference between the notch electrode NE1 and the second electrode part E2. A voltage applied to the main electrode ME is different from a voltage applied to the second electrode part E2, so that there is a voltage difference between the main electrode ME and the second electrode part E2. The first fluid 232 moves toward the first notch electrode NE1, or spreads in an opposite direction according to the voltage difference between the main electrode ME and the second electrode part E2. The second notch electrode NE2 may receive a substantially same voltage as the main electrode ME.

The common voltage is first voltage. When the first voltage is applied to the first notch electrode NE1, and the second voltage is applied to the second notch electrode NE2 and the main electrode ME, the first fluid 232 may move toward the first notch electrode NE1, or may move from the first notch electrode NE1 to spread a certain width. The certain width may change according to the difference between the first voltage and the second voltage. When the second voltage is a maximum voltage applied to the first electrode parts E1, the first fluid 232 is maximally concentrated at the first notch electrode NE1. The first fluid 232 may be maximally adhered to the partition wall 214. When the second voltage is substantially same as the first voltage (the common voltage), the first fluid 232 may spread to entirely cover the area in which the main electrode ME and the first and second notch electrodes NE1 and NE2 are formed.

Referring to FIGS. 2A and 2B, the first voltage may be applied to the first main electrode M1 and the first and second notch electrodes N11 and N12 of the first area electrode E11 and the third main electrode M3 and the first and second notch electrodes N31 and N32 of the third area electrode E13. Thus, the first fluid 232 spreads to entirely cover the first and third area electrodes E11 and E13.

When the first voltage is applied to the first notch electrode N21 of the second area electrode E12, and the second voltage, which is the maximum voltage, is applied to the second notch electrode N22 and the second main electrode M2 of the second area electrode E12, the first fluid 232 is concentrated at the first notch electrode N21 of the second area electrode E12. In addition, when the first voltage is applied to the first notch electrode N41 of the fourth area electrode E14, and the second voltage is applied to the second notch electrode N42 and the fourth main electrode M4 of the fourth are electrode E14, the first fluid 232 is maximally concentrated at the first notch electrode N41 of the fourth area electrode E14.

The first fluid 232 corresponding to the first electrode parts E1 of the odd columns including the first and third area electrodes E11 and E13 spreads to totally cover the first electrode parts E1 of the odd columns. However, the first fluid 232 corresponding to the first electrode parts E1 of the even columns including the second and fourth area electrodes E12 and E14 maximally concentrates toward the first notch electrode NE1.

Hereinafter, in a 3D stereoscopic mode, referring to FIG. 4, a barrier structure is explained, which the parallax barrier panel 200 forms according to the position of the first fluid 232.

Figure 4:
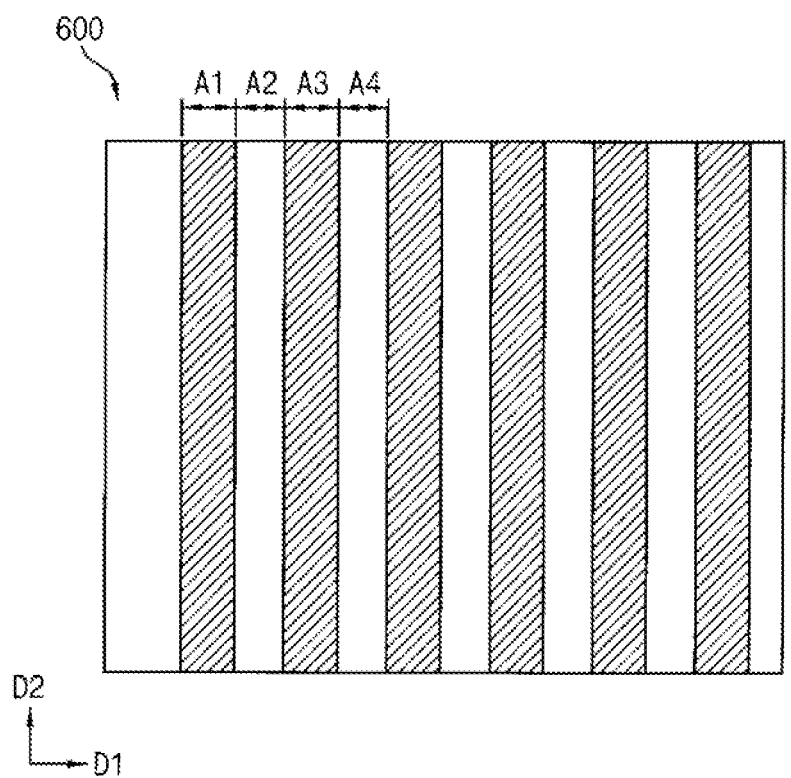
FIG. 4 is a plan view illustrating a barrier structure of a parallax barrier panel of FIG. 2A.

FIG. 4 is a plan view illustrating a barrier structure of a parallax barrier panel of FIG. 2A.

Referring to FIGS. 2A, 2B and 4, a first area A1 of the barrier structure 600 is a light blocking area when in a state when the first fluid 232 entirely covers the first area electrode E11. A second area A2 of the barrier structure 600 is a light transmitting area when in a state when the first fluid 232 concentrates at the first notch electrode N21 of the second area electrode E12.

In addition, the third area A3 of the barrier structure 600 corresponding to the third area electrode E13 is a light blocking area, and the fourth area A4 of the barrier structure 600 corresponding to the fourth area electrode E14 is a light transmitting area.

Thus, the barrier structure 600 formed by the parallax barrier panel 200 may extend in the second direction D2, and may have a lattice structure including stripe patterns consecutively arranged in the first direction D1. The stripe patterns blocks a portion of incident light. The parallax barrier panel 200 representing the barrier structure 600 uses binocular parallax such that a viewer may stereoscopically view a 3D stereoscopic image displayed by the display panel 100.

As described above, the voltage applied to each of the first, second, third and fourth area electrodes E11, E12, E13 and E14 may be controlled so that the parallax barrier panel 200 forms the barrier structure 600. The parallax barrier panel 200 forms the barrier structure 600 in a 3D stereoscopic image mode. In the 3D stereoscopic image mode, the viewer may stereoscopically view the 3D stereoscopic image displayed by the display panel 100.

Figure 5:
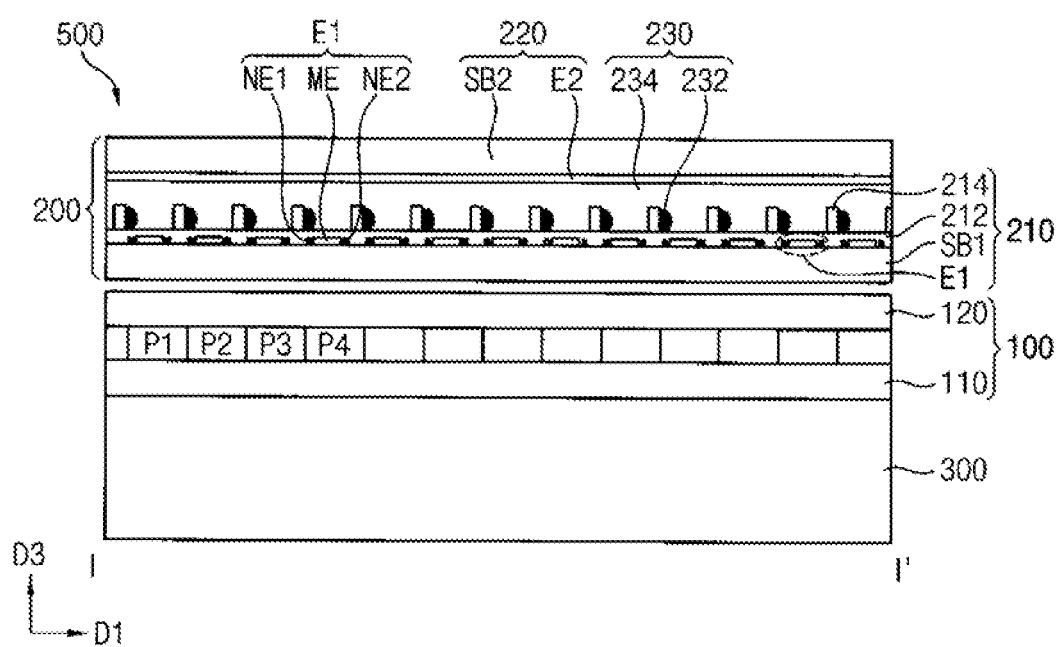
FIG. 5 is a cross-sectional view illustrating a display apparatus in a 2-dimensional (2D) image mode view taken along a line I-I' of FIG. 1.

FIG. 5 is a cross-sectional view illustrating a display apparatus in a 2-dimensional (2D) image mode taken along a line I-I' of FIG. 1.

Referring to FIGS. 2B and 5, in the 2D image mode, the 2D image displayed by the display panel 100 passes through the parallax barrier panel 200 without being block by a barrier structure. Thus, the viewer views the 2D image. In the 2D image mode, all areas of the parallax barrier panel 200 become light transmitting areas.

For example, the first notch electrode N11 of the first area electrode E11 receives the first voltage, and the first main electrode M1 and the second notch electrode N12 of the first area electrode E11 receive the second voltage. In addition, the first notch electrode N31 of the third area electrode E13 receives the first voltage, and the third main electrode M3 and the second notch electrode N32 of the third area electrode E13 receive the second voltage. That is, the first and third area electrodes E11 and E13 receives the voltages substantially the same as the second and fourth area electrodes E12 and E14. The first fluid 232 on all the first electrodes E1 concentrate at the first notch electrodes NEE so that the areas of the parallax barrier panel 200 are light transmitting areas in the 2D image mode. Thus, the parallax barrier panel 200 transmits the 2D image, unblocked by any barrier structure, which the display panel 100 displays, so that the viewer may view the 2D image.

As described above, the parallax barrier panel 200 controls a mode of the display apparatus to be the 2D image mode or the 3D stereoscopic image mode according to the voltage applied to the first electrode parts E1 and second electrode part E2.

When the display apparatus 500 displays the 3D stereoscopic image in the 3D stereoscopic image mode, the barrier structure 600 formed by the parallax barrier panel 200 may be changed according to movement of the viewer, which may reduce distortion of the 3D stereoscopic image as seen by the viewer viewing the 3D stereoscopic image from different vantages. That is, the barrier structure 600 formed by the parallax barrier panel 200 may be position-tracked to adjust to the movement of the viewer. The display apparatus 500 may further include a sensor sensing the movement of the viewer.

Hereinafter, the position-tracking of the barrier structure 600 of the parallax barrier panel 200 is explained with reference to FIGS. 6A to 6E and FIG. 7.

FIGS. 6A to 6E are cross-sectional views illustrating a method of tracking a position of the barrier structure 600 of the parallax barrier panel of FIG. 2A.

Figure 6A:
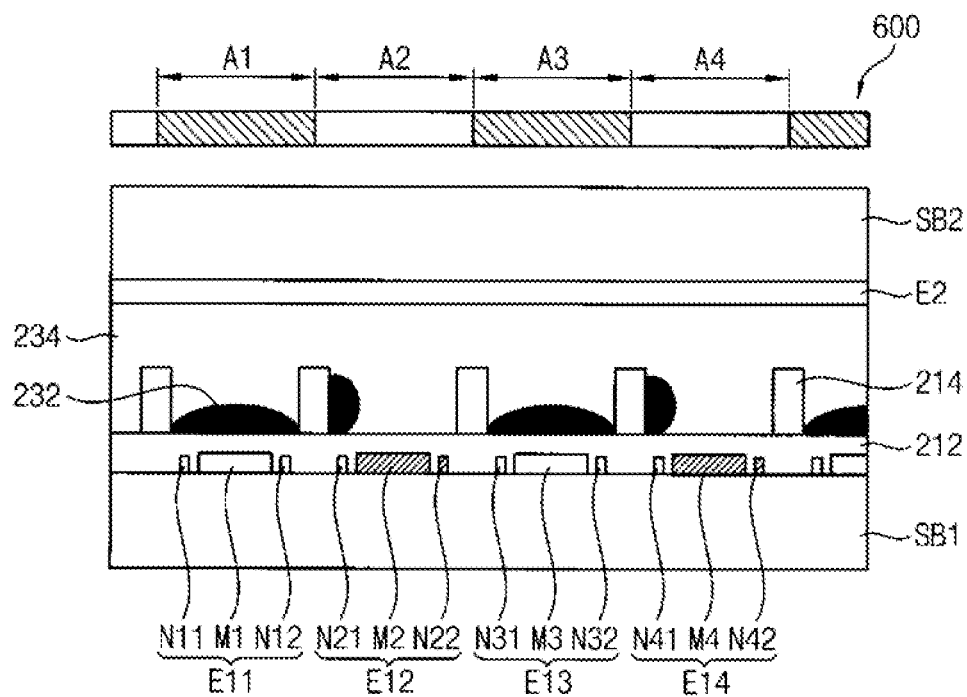
FIGS. 6A to 6E are cross-sectional views illustrating a method of tracking a position of the parallax barrier panel of FIG. 2A.

Referring to FIG. 6A, a first voltage, which is a common voltage, is applied to the second electrode part E2, and voltages substantially the same as the voltages forming the barrier structure 600 described in FIG. 4 are applied to the first, second, third and fourth area electrodes E11, E12, E13 and E14. The second voltage applied to the second and fourth main electrodes M2 and M4, the second notch electrode N22 of the second area electrode E12 and the second notch electrode N42 of the fourth area electrode E14 may be a maximum voltage Vmax of the voltages applied to the first electrode parts E1.

Thus, the first area A1 and the third area A3 of the barrier structure 600 corresponding to the first area electrode E11 and the third area electrode E13 become light blocking areas, and the second area A2 and the fourth area A4 of the barrier structure 600 corresponding to the second area electrode E12 and the fourth area electrode E14 become light transmitting areas.

Figure 6B:
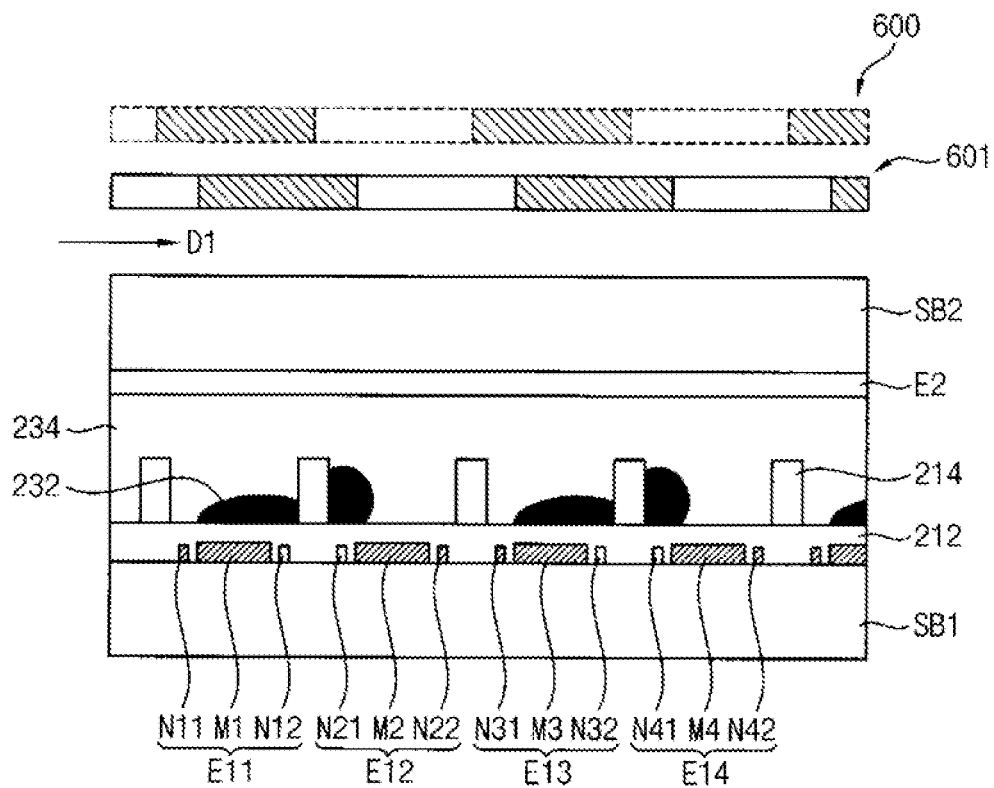

Referring to FIG. 6B, in the parallax barrier panel 200 described in FIG. 6A, when a viewpoint of a viewer moves in the first direction D1, the second voltages applied to the first, second, third and fourth areas E11, E12, E13 and E14 gradually change.

For example, in the first area electrode E11, the second voltage smaller than the maximum voltage Vmax may be applied to each of the first notch electrode N11 and the first main electrode M1. For example, a difference between the maximum voltage Vmax and the first voltage V0 is divided into n parts according a grayscale (here, 'n' is a natural number larger than or equal to 2). Thus, the difference between the maximum voltage Vmax and the first voltage V0 is divided into a first signal V1, a second signal V2, and so on, up to an n-th signal Vn. The maximum voltage Vmax becomes the n-th signal Vn. The voltage applied to the first main electrode M1 may be the first signal V1. The first voltage V0 is applied to the second notch electrode N12 of the first area electrode E11 substantially the same as before the viewpoint moves.

In the third area electrode E13, the first signal V1 is applied to each of the first notch electrode N31 and the third main electrode M3, and the first voltage V0 is applied to the second notch electrode N32 of the third area electrode E13, substantially the same as that applied to the first area electrode E11.

Thus, the first fluid 232 on the first and third area electrodes E11 and E13 spreads in the receiving space formed by the partition wall 214, and the first fluid 232 moves toward the partition wall 214 adjacent to each of the second notch electrode N12 of the first area electrode E11 and the second notch electrode N32 of the third are electrode E13. Thus, the first fluid 232 on the first and third area electrodes E11 and E13 recedes from the partition wall 214 adjacent to the first notch electrodes N11 and N31.

In the second area electrode E12, the second voltage smaller than the maximum voltage Vmax is applied to the second main electrode M2 and the second notch electrode N22. A (n−1)-th signal Vn−1 is applied to the second main electrode M2 and the second notch electrode N22 of the second area electrode E12. The first voltage V0, substantially the same voltage before moving the viewpoint, is applied to the first notch electrode N21 of the second electrode E12.

In the fourth area electrode E14, the (n−1)-th signal Vn−1 is applied to the main electrode M4 and the second notch electrode N42, substantially the same as that applied to the second area electrode E12. The first voltage V0, substantially the same voltage before moving the viewpoint, is applied to the first notch electrode 41 of the fourth area electrode E14.

Thus, a first tracked barrier structure 601 is formed in which the first, second, third and fourth areas A1, A2, A3 and A4 of the barrier structure 600 described in FIG. 4 are shifted in the first direction D1.

The second voltage consecutively applied to the first and third area electrodes E11 and E13 gradually increases from the first signal V1 to the (n/2)-th signal Vn/2. The second voltage gradually increases, while the first voltage V0 is applied to the second notch electrode N12 of the first area electrode E11 and the second notch electrode N32 of the third area electrode E13.

At the same time, the second voltage applied to the second and fourth area electrodes E12 and E14 gradually decreases from the (n−1)-th signal Vn−1 to the (n/2)-th signal Vn/2. The second voltage gradually decreases, while the first voltage V0 is applied to the first notch electrode N21 of the second area electrode E12 and the first notch electrode N41 of the fourth area electrode E14.

Figure 6C:
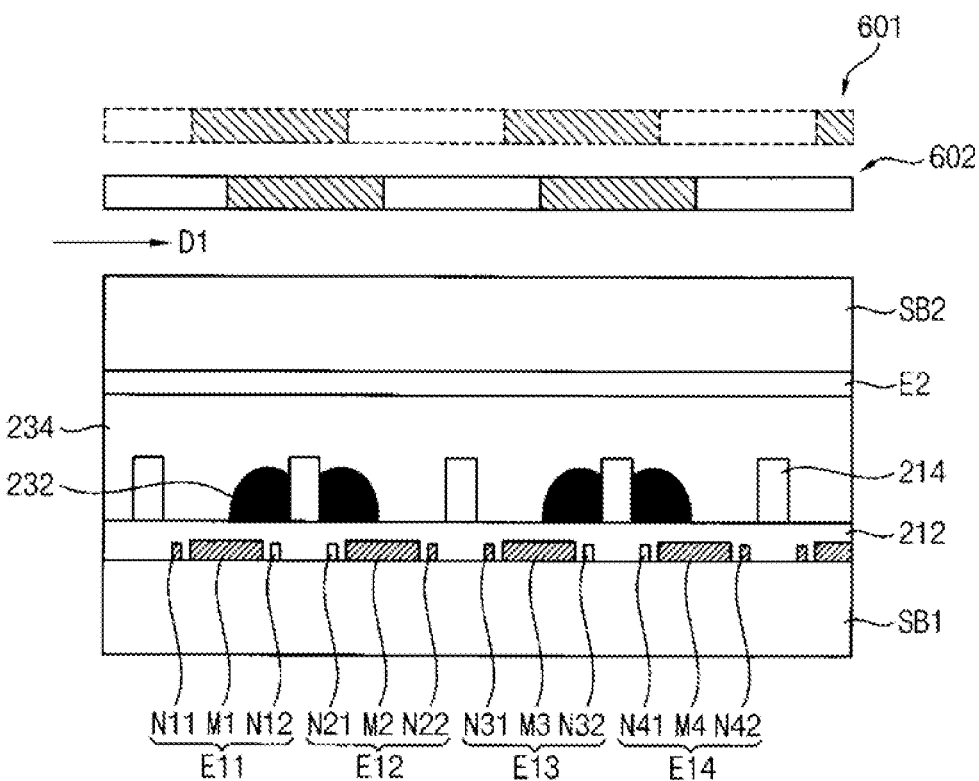

Referring to FIG. 6C, when the second voltage applied to the first, second, third and fourth area electrodes E11, E12, E13 and E14 becomes a (n/2)-th signal Vn/2, the second fluid 232 on the first area electrode E11 and the second area electrode E12 adheres to the partition wall 214 disposed on the boundary of the first area electrode E11 and the second area electrode E12. That is, the second fluid 232 disposed in the receiving space formed by the partition wall 214 may move toward the second notch electrode N12 of the first area electrode E11 and the first notch electrode N21 of the second area electrode E12 to be disposed on the second notch electrode N12 of the first area electrode E11 and the first notch electrode N21 of the second area electrode E12. The second fluid 232 may cover a half of each receiving space in the first direction D1.

Thus, an intermediate barrier structure 602 including the first area A1 shifted by a half from the first area A1 of the barrier structure 600 described in FIG. 4 is formed. The first tracked barrier structure 601 may be shifted to form the intermediate barrier structure 602. When the first tracked barrier structure 601 becomes the intermediate barrier structure 602, the second voltage gradually increases or gradually decreases, so that the second fluid 232 may generally move in the second direction D1.

Figure 6D:
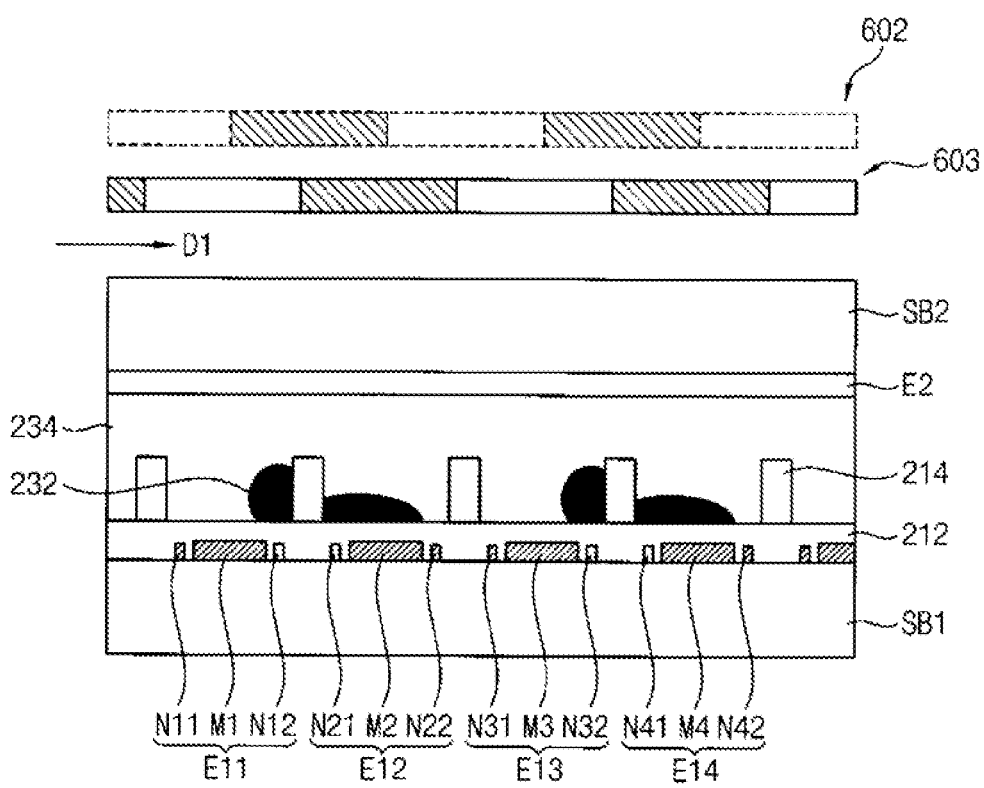

Referring to FIG. 6D, the second voltage applied to the first and third area electrodes E11 and E13 may have a value between the (n/2)-th signal Vn/2 and the n-th signal Vn. The second notch electrode N12 of the first area electrode E11 and the second notch electrode N32 of the third area electrode E13 receive the first voltage V0.

At the same time, the second voltage applied to the second and fourth area electrodes E12 and E14 may have a value smaller than the (n/2)-th signal Vn/2 and larger than the first signal V1. The first voltage V0 is applied to the first notch electrode N21 of the second area electrode E12 and the first notch electrode N41 of the fourth area electrode E14.

Thus, a second tracked barrier structure 603 is formed in which the first area A1 of the barrier structure 602 described in FIG. 6C is shifted by a certain distance in the first direction D1. The second tracked barrier structure 603 may be an inversion barrier structure, having an inverse form of that of the first tracked barrier structure 601 in the second direction D2.

The second voltage consecutively applied to the first and third area electrodes E11 and E13 increases to the n-th signal Vn, which is the maximum voltage Vmax. The second voltage gradually increases, while the first voltage V0 is applied to the second notch electrode N12 of the first area electrode E11 and the second notch electrode N32 of the third area electrode E13.

At the same time, the second voltage applied to the second and fourth area electrodes E12 and E14 gradually decreases to the first voltage V0. The second voltage gradually decreases, while the first voltage V0 is applied to the first notch electrode N21 of the second area electrode E12 and the first notch electrode N41 of the fourth area electrode E14.

Figure 6E:
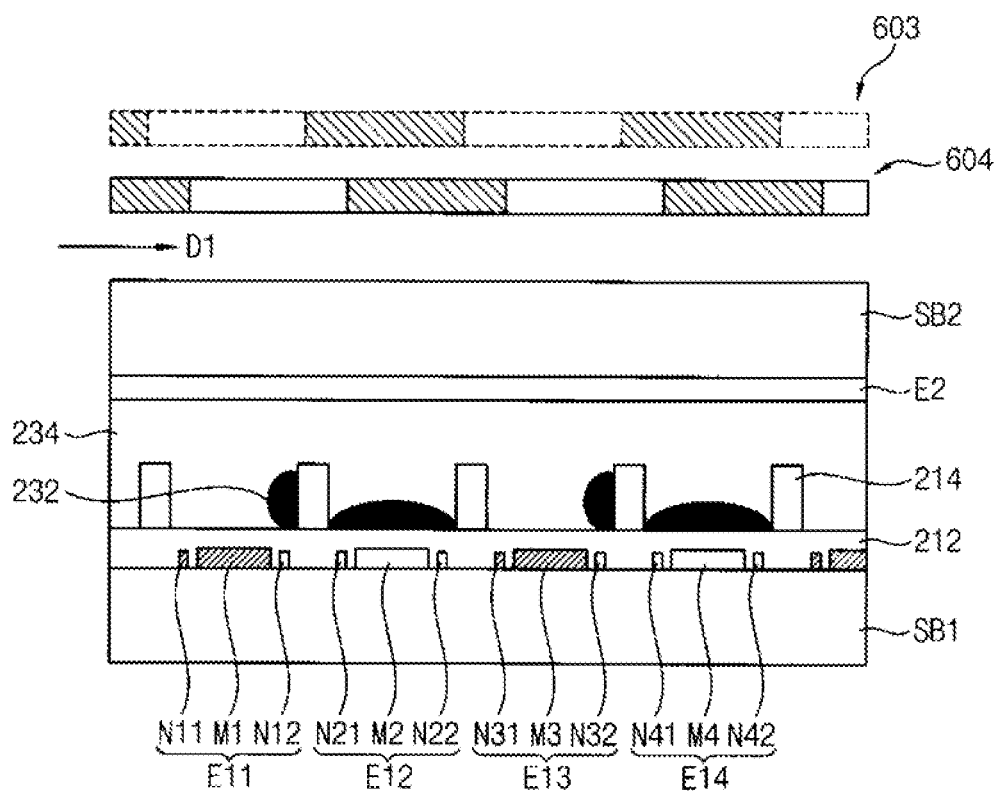

Referring to FIG. 6E, when the second voltage applied to the first and third area electrodes E11 and E13 is the n-th signal Vn and the second voltage applied to the second and fourth area electrodes E12 and E14 is the first voltage V0, the first fluid 232 on the first and third area electrodes E11 and E13 concentrates at the partition wall 214. In addition, the first fluid 232 on the second and fourth area electrodes E12 and E14 spreads to totally cover the second and fourth area electrodes E12 and E14.

Thus, a final tracked barrier structure 604 is formed, in which the first area A1 of the second tracked barrier structure 603 is shifted by a half of the width of the first area A1. The original barrier structure 600 is shifted by the width of the first area A1 in the first direction D1, so that the final tracked barrier structure 603 is formed. The second tracked barrier structure 603 becomes the final tracked barrier structure 604 while the second voltage is gradually increased or gradually decreased, so that the second fluid 232 may naturally move in the first direction D1.

As described in FIGS. 6A to 6E, the first fluid 232 is controlled by the voltages applied to the first, second, third and fourth area electrodes E11, E12, E13 and E14 so that position-tracking may be implemented. The first, second, third and fourth main electrodes M1, M2, M3 and M4 may be unitary components, not divided in the second direction D2.

Figure 7:
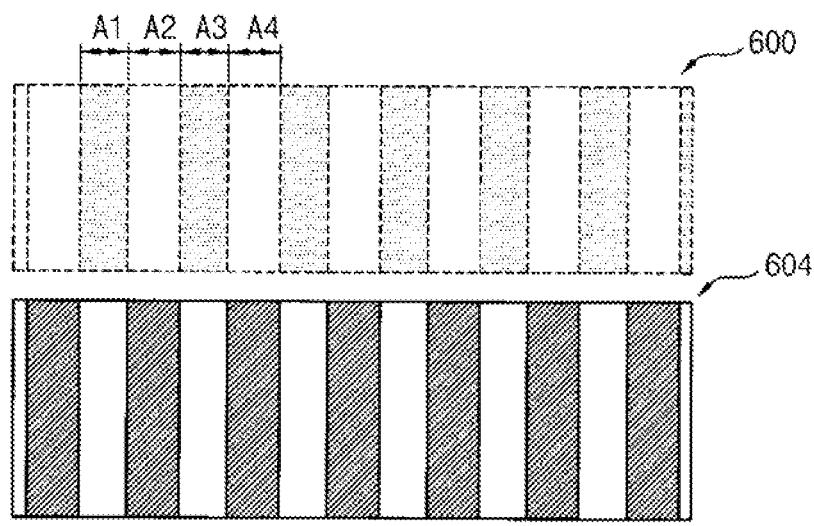
FIG. 7 is plan view illustrating a barrier structure position-tracked.

FIG. 7 is plan view illustrating a barrier structure through position tracking.

Referring to FIG. 7, as a viewpoint move in the first direction D1, the original barrier structure 600 of the parallax barrier panel 200 is changed into the final tracked barrier structure 604. Thus, the first and third areas A1 and A3 in the original barrier structure 600 gradually change from light blocking areas into light transmitting areas, and the second and fourth areas A2 and A4 in the original barrier structure 600 gradually change from light transmitting areas into light blocking areas.

In FIGS. 6A to 6E and FIG. 7, the first fluid 232 moves in the first direction D1 when the viewpoint of the viewer moves in the first direction D1. The first fluid 232 may move opposite the first direction D1 when the viewpoint of the viewer moves opposite to first direction D1 based on substantially the same principle as described in FIGS. 6A to 6E. That is, the first fluid 232 on the first notch electrode E11 is controlled, so that the first fluid 232 spreads and then concentrates at the first notch electrode N11, and the second fluid 232 on the second area electrode E12 is controlled, so that the second fluid 232 entirely spreads to cover the second area electrode E12.

As described above, each of the first electrode parts E1 include the main electrode ME, the first notch electrode NE1 and the second notch electrode NE2, and may be controlled for position-tracking. Thus, though the viewer moves the viewpoint, the 3D stereoscopic image may be viewed with reduced distortion by position-tracking.

Figure 8:
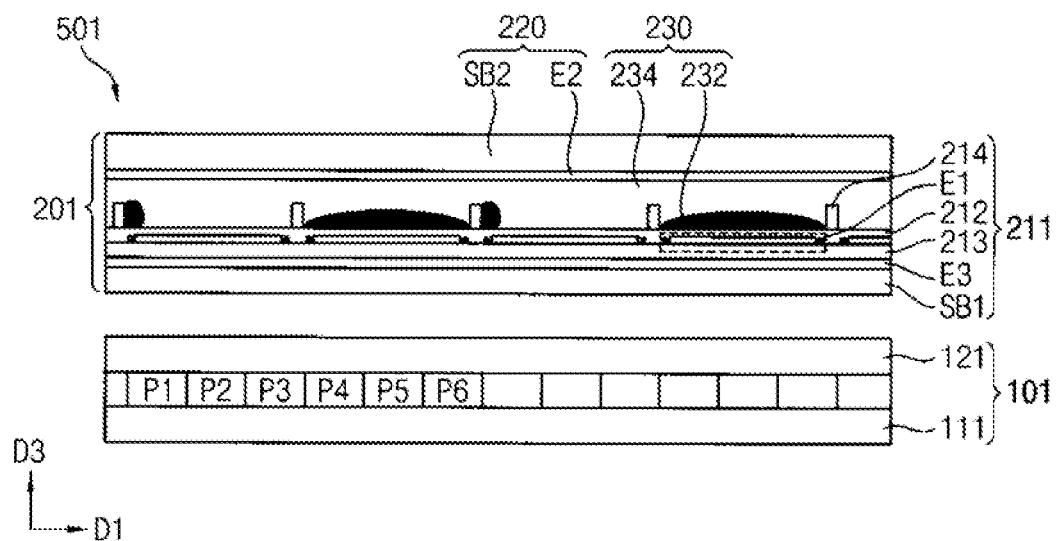
FIG. 8 is a cross-sectional view illustrating a display apparatus according to an exemplary embodiment of the present invention.

FIG. 8 is a cross-sectional view illustrating a display apparatus according to an exemplary embodiment of the present invention.

An exemplary stereoscopic structure of the display apparatus according to FIG. 8 is substantially the same as the exemplary stereoscopic structure of the display apparatus of FIG. 1, except for a light providing unit. Thus, an exemplary display apparatus according to FIG. 8 is explained with reference to FIGS. 1 and 8.

Referring to FIGS. 1 and 8, a display apparatus 501 includes a display panel 101 and a parallax barrier panel 201. The display panel 101 is disposed under the parallax barrier panel 201.

The display panel 101 includes a first display substrate 111 and a second display substrate 121. The first display substrate 111 may include an electroluminescence element. For example, the electroluminescence element may be an organic light-emitting diode (OLED). The display panel 101 includes unit pixels P1, P2, P3, P4, P5 and P6 defined by the first and second display substrates 111 and 121 and includes the electroluminescence element. The unit pixels P1, P2, P3, P4, P5 and P6 are arranged linearly in the first direction D1. In FIG. 8, a pixel of the display panel 101 includes a group of three unit pixels.

The parallax barrier panel 201 is disposed on the display panel 101 and includes a first substrate 211 including a plurality of first electrode parts E1, a second substrate 220 including a second electrode part E2 and a fluidic layer 230.

The first substrate 211 is disposed on the second display substrate 121 of the display panel 101. The first substrate 211 further includes a first base substrate SB1, a plurality of third electrode parts E3 formed on the first base substrate SB1, an insulating layer 213 formed on the third electrode parts E3, and a water-repellent layer 212 formed on the first electrode parts E1 and the insulating layer 213, wherein a partition wall 214 is formed on the water-repellent layer 212 between the first electrode parts E1.

Each of the first electrode parts E1 correspond to three unit pixels arranged in the first direction D1. For example, one of the first electrode parts E1 corresponds to a pixel including first, second and third unit pixels P1. P2 and P3 arranged in the first direction D1, and another of the first electrode parts E1 corresponds to the pixel including fourth, fifth and sixth unit pixels P4, P5 and P6 arranged in the first direction D1. Each first electrode part E1 includes a main electrode ME, a first notch electrode NE1 and the second notch electrode NE2. The first and second notch electrodes NE1 and NE2 are disposed adjacent to both ends of the main electrode ME, and spaced apart from the main electrode ME. The first electrode parts E1 may include a transparent conductive material. For example, the first electrode parts E1 may include indium zinc oxide (IZO), indium tin oxide (ITO), etc.

The main electrode ME, the first notch electrode NE1 and the second notch electrode NE2 of one first electrode part E1 of the first electrode parts E1 may receive signals separate from each other, respectively.

The water-repellent layer 212 is formed on the first base substrate SB1 on which the first electrode parts E1 are formed, and the partition wall 214 is formed on the water-repellent layer 212. The water-repellent layer 212 is substantially the same as the water-repellent layer described in FIG. 2A, and thus any repetitive explanation thereof will be omitted.

The insulating layer 213 is disposed between the first electrode parts E1 and the first base substrate SB1, and insulates the first electrode parts E1 from the third electrode parts E3. The third electrode parts E3 are formed between the insulating layer 213 and the first base substrate SB1.

The third electrode parts E3 are formed on the first base substrate SB1 and cross the first electrode parts E1. The first electrode parts E1 make the barrier structure of the parallax barrier panel 201 when the display apparatus 501 is disposed in a horizontal mode, hereinafter, referred as a first display mode. Alternatively, the third electrode parts E3 make the barrier structure of the parallax barrier panel 201 when the display apparatus 501 is disposed in a vertical mode, hereinafter, referred as a second display mode, wherein the display apparatus 501 is rotated 90 degrees from the horizontal mode in a plane formed by the first direction D1 and the second direction D2, and perpendicular to the third direction D3.

In a cross-sectional view illustrating the third apparatus 501 taken along the first direction D1, the third electrodes E3 may be formed on the entire first base substrate SB1. The specific structure of the third electrode parts E3 and a relation between the first electrode parts E1 and the third electrode parts E3 may be explained with reference to FIG. 10.

The partition wall 214 is formed on the water-repellent layer 212, and may have a structure as described with reference to FIG. 3A or FIG. 3B. The opening part HR of the partition wall 214 may correspond to three unit pixels of the unit pixels arranged in the first direction D1. That is, the partition wall 214 is disposed on the water-repellent layer 212, and corresponds to an edge of the first unit pixel P1, a boundary of the third and fourth unit pixels P3 and P4 and an edge of the sixth unit pixel P6.

The second electrode part E2 of the second substrate 220 is formed on the second base substrate SB2 facing the first substrate 211. The second electrode part E2 may be entirely formed on the second base substrate SB2. Alternatively, the second electrode part E2 may include a plurality of sub-electrodes extended in the second direction D2 crossing the first electrode parts E1.

The fluidic layer 230 includes a first fluid 232 and a second fluid 234. The fluidic layer 230 is substantially the same as the fluidic layer 230 in FIG. 2A, and thus any repetitive explanation thereof will be omitted.

Hereinafter, referring to FIGS. 9 and 10, the first and third electrode parts E1 and E3 are explained in more detail.

Figure 9:
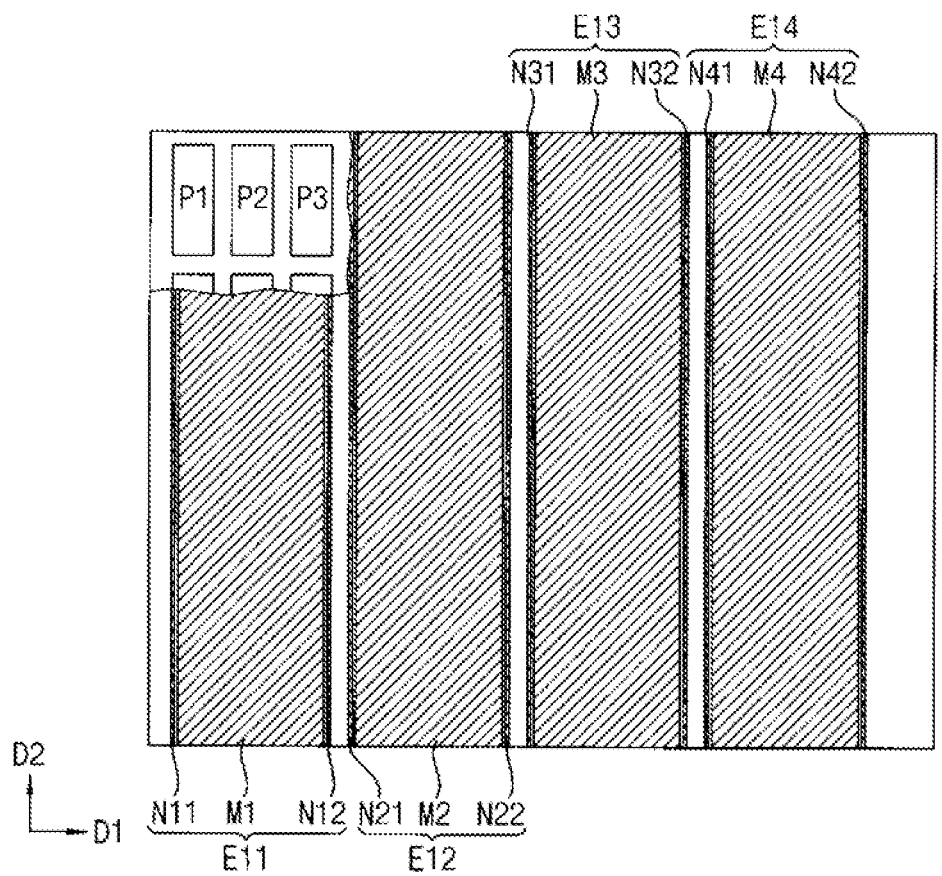
FIG. 9 is a plan view illustrating a first electrode part of FIG. 8.

FIG. 9 is a plan view illustrating a first electrode part of FIG. 8.

Referring to FIG. 9, the first electrode parts E1 extend in the second direction D2. Hereinafter, the first electrode parts E1 includes first, second, third and fourth area electrodes E11, E12, E13 and E14.

The first area electrode E11 corresponds to first, second and third unit pixels P1, P2 and P3 arranged in the first direction D1 and unit pixels arranged in the second direction D2 with respect to the first, second and third unit pixels P1, P2 and P3. The second area electrode E12 corresponds to fourth, fifth and sixth unit pixels P4, P5 and P6 arranged in the first direction D1 and unit pixels arranged in the second direction D2 with respect to the fourth, fifth and sixth unit pixels P4, P5 and P6.

Though not described in figures, the third area electrode E13 may correspond to three unit pixels being adjacent to the sixth unit pixel P6 arranged in the first direction D1 and additional unit pixels arranged in the second direction D2 with respect to the three unit pixels corresponding to the third area electrode E13, and the fourth area electrode E14 may correspond to three unit pixels arranged in the first direction D1 and additional unit pixels arranged in the second direction D2 with respect to the three unit pixels corresponding to the fourth area electrode E14.

The first, second, third and fourth area electrodes E11, E12, E13 and E14 include first, second third and fourth main electrodes M1, M2, M3 and M4, respectively. The first and second notch electrodes N11 and N12 of the first area electrode E11 are disposed adjacent to both end of the first main electrode M1. The first and second notch electrodes N21 and N22 of the second area electrode E12 are disposed adjacent to both end of the second main electrode M2. The first notch electrode N21 of the second area electrode E12 may be adjacent to the second notch electrode N12 of the first area electrode E11 in the first direction D1. In addition, the first and second notch electrodes N31 and N32 of the third area electrode E13 are disposed adjacent to both end of the third main electrode M3, and the first and second notch electrodes N41 and N42 of the fourth area electrode E14 are disposed adjacent to both end of the fourth main electrode M4.

The first, second, third and fourth area electrodes E11, E12, E13 and E14 receive signals separate from each other, respectively. The signal connecting structure and method of the first, second, third and fourth area electrodes E11, E12, E13 and E14 is substantially the same as the signal connecting structure and method of the first, second, third and fourth area electrodes E11, E12, E13 and E14 described with reference to FIG. 2B. Thus, any repetitive explanation thereof will be omitted.

Figure 10:
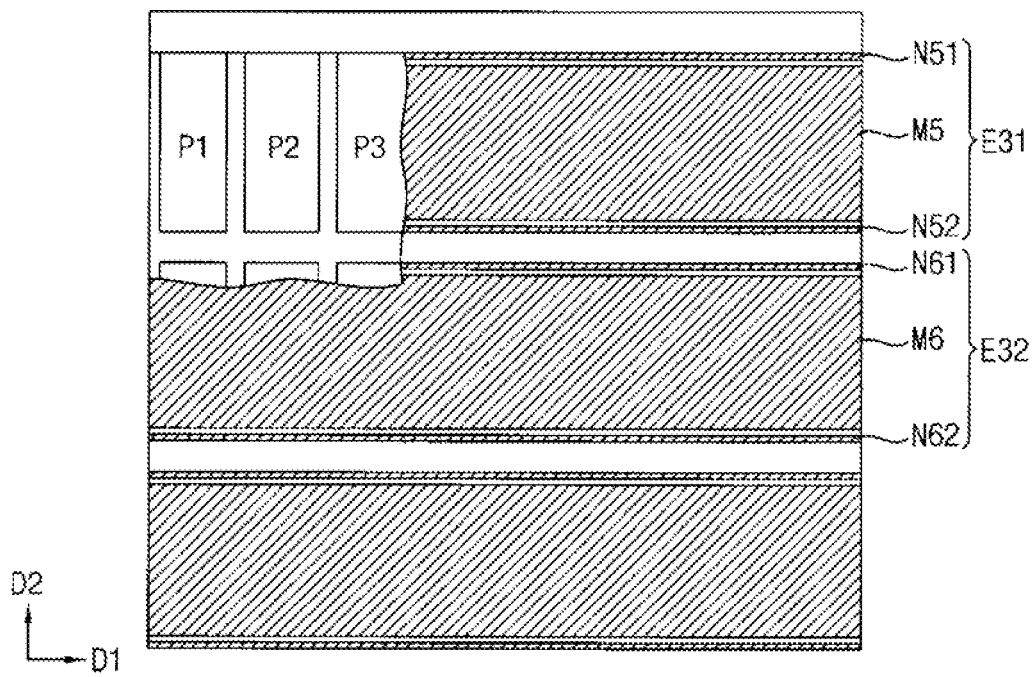
FIG. 10 is a plan view illustrating a third electrode part of FIG. 8.

FIG. 10 is a plan view illustrating a third electrode part of FIG. 8.

Referring to FIG. 10, the third electrode parts E3 extend in the first direction D1, and are spaced apart from each other. Each third electrode part E3 includes a crossing electrode and third and fourth notch electrodes disposed adjacent to both ends of the crossing electrode. Hereinafter, the third electrode parts E3 include fifth and sixth area electrodes E31 and E32.

The fifth area electrode E31 may correspond to a first unit pixel P1 and unit pixels arranged in the first direction D1 adjacent to the first unit pixel P1. For example, the fifth area electrode E31 may correspond to all of the first, second, third, fourth, fifth and sixth unit pixels P1, P2, P3, P4, P5 and P6. The fifth area electrode E31 includes a first crossing electrode M5 extended in the first direction D1 and third and fourth notch electrodes N51 and N52 disposed adjacent to both ends of the first crossing electrode M5. A width of the first crossing electrode M5 may be substantially the same as the width of the main electrode ME of the first electrode parts E1. The fifth area electrode E31 partially overlaps with one unit pixel when the fifth area electrode E31 has substantially the same shape as the first electrode parts E1 described in FIG. 2B, so that the barrier structure of the second display mode may be not formed.

The sixth area electrode E32 includes a second crossing electrode M6 extended in the first direction D1 and third and fourth notch electrodes N61 and N62 disposed adjacent to both ends of the second crossing electrode N62. The sixth area electrode E32 may have substantially the same shape as the fifth area electrode E31 except that the sixth area electrode E32 is adjacent to the fifth area electrode E31 in the second direction D2.

Each third electrode part E3 may be substantially the same as each first electrode part E1, excepting the direction in which the third electrode parts E3 extend.

In the first display mode of the 3D stereoscopic mode, the movement of the first fluid 232 of the fluidic layer 230 is controlled by voltages applied to the first electrode parts E1 and the second electrode E2, so that the parallax barrier panel 201 is used as a barrier structure. Alternatively, in the second display mode of the 3D stereoscopic mode, the movement of the first fluid 232 of the fluidic layer 230 is controlled by voltages applied to the third electrodes E3 and the second electrode E2, so that the parallax barrier panel 201 is used as a barrier structure.

Thus, the barrier structure of the parallax barrier panel 201 may rotate according to a rotation of the display apparatus 501 so that the 3D stereoscopic image may be displayed in all the first and second display modes.

Alternatively, the method of tracking the position by changing the voltages applied to the first electrode parts E1 and the second electrode part E2 is substantially the same as the method described with reference to FIGS. 6A to 6E and FIG. 7. Thus, any repetitive explanation thereof will be omitted. In addition, in the second display mode in which the barrier structure is displayed by the third electrode parts E3 and the second electrode part E2, the position may be tracked in substantially the same principle.

In FIGS. 8 to 10, the display panel 101 is an electroluminescence display panel including an electroluminescence element. Alternatively, the display panel 101 may be a liquid crystal display panel using liquid crystal described in FIG. 2A as a display element. When the display panel 101 is a liquid crystal display panel, the light providing unit 300 described in FIGS. 1 and 2A may be disposed under the parallax barrier panel 201. Alternatively, the parallax barrier panel 201 may be disposed between the liquid crystal display panel and the light providing unit 300.

Figure 11:
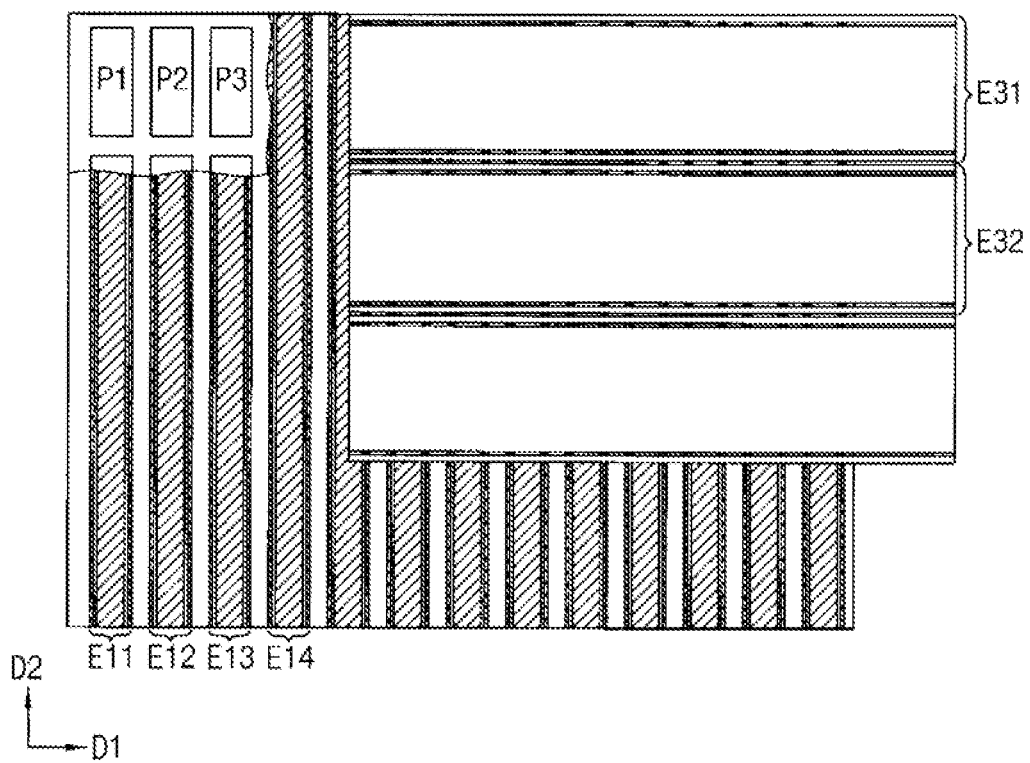
FIG. 11 is a plan view illustrating structures of a first electrode and a third electrode a display apparatus according to an exemplary embodiment of the present invention.

FIG. 11 is a plan view illustrating structures of a first electrode and a third electrode a display apparatus according to an exemplary embodiment of the present invention.

The display apparatus according to the present example embedment of FIG. 11 is substantially the same as the display apparatus according to the previous exemplary embodiment of FIGS. 8 to 10 except for a structure of first electrode part, and thus the same reference numerals will be used to refer to the same or like parts as those described with reference to FIGS. 8 to 10 and any repetitive explanation thereof will be omitted.

Referring to FIGS. 8 and 11, structure of the first electrode parts E1 of a parallax barrier panel is substantially same as the structure explained in FIG. 2B. That is, the first, second, third and fourth area electrodes E11, E12, E13 and E14 are spaced apart from each other, and extend in a second direction D2. The first are electrode E11 is disposed over the first unit pixel P1 and the unit pixels disposed in the second direction with respect to the first unit pixel P1. The second area electrode E12 is disposed over the second unit pixel P2 and the unit pixels disposed in the second direction with respect to the second unit pixel P2. The third area electrode E13 corresponds to the third unit pixel P3 and the unit pixels disposed in the second direction with respect to the third unit pixel P3.

The third electrode parts E3 crossing the first electrode parts E1 extend in the first direction D1, and are spaced apart from each other. The structure of the third electrode parts E3 is substantially the same as the structure of the third electrode parts described with reference to FIG. 10. Thus, any repetitive explanation thereof will be omitted.

As described above, a width of the first electrode part E1 may be designed according to a width of the unit pixel, and a width of the third electrode part E3 may be designed according to a width of three unit pixels. Thus, the 3D stereoscopic image may be displayed in the first display mode, which is a horizontal display mode, or in the second display mode, which is a vertical display mode.

Figure 12:
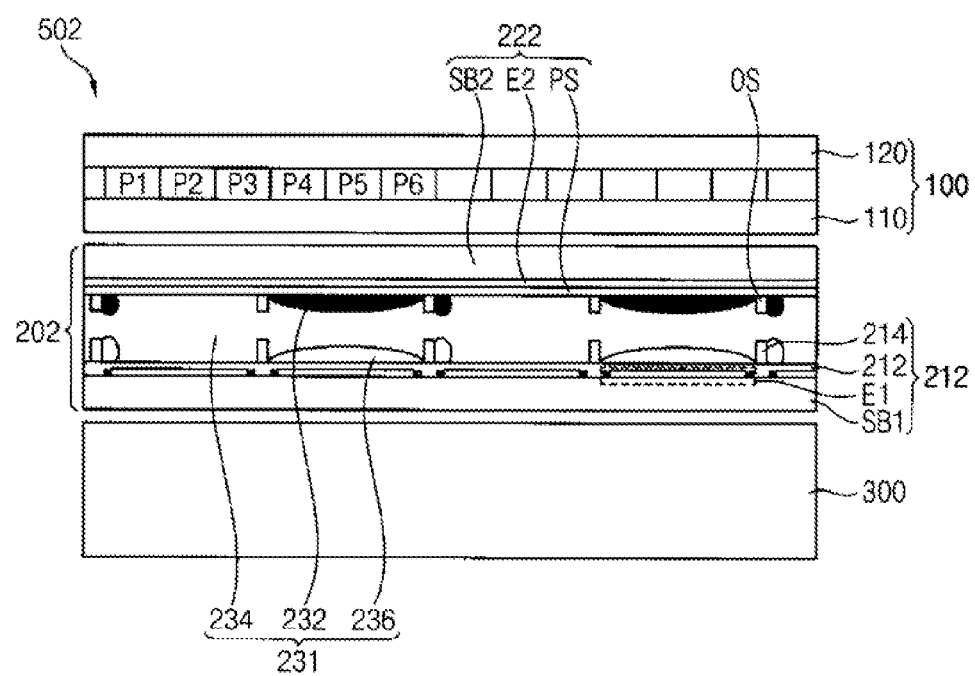
FIG. 12 is a cross-sectional view illustrating a display apparatus according to an exemplary embodiment of the present invention.

FIG. 12 is a cross-sectional view illustrating a display apparatus according to an exemplary embodiment of the present invention.

Referring to FIG. 12, a display apparatus 502 includes a display panel 100, a parallax barrier panel 202 and a light providing unit 300. The display panel 100 is a liquid crystal display panel using liquid crystal disposed between a first display substrate 110 and a second display substrate 120 as a display element.

The parallax barrier panel 202 is disposed between the display panel 100 and the light providing unit 300. The parallax barrier panel 202 includes a first substrate 212, a second display substrate 222 and a fluidic layer 231. The second substrate 222 may be disposed under the first display substrate 110 of the display panel 100.

The first substrate 212 includes a first base substrate SB1, a plurality of first electrode parts E1, a water-repellent layer 212 and a partition wall 214.

The structure of the first electrodes E1 is substantially same as the structure of the first electrodes E1 explained with reference to FIG. 9. In addition, the partition wall 214 may have a substantially same structure explained with reference to FIG. 3A or FIG. 3B. Thus, any repetitive explanation thereof will be omitted.

The second substrate 222 includes a second base substrate SB2, a second electrode part E2, a passivation layer PS and an opposite partition wall OS. The passivation layer PS is formed on the second base substrate SB2 on which the second electrode part E2 is formed, and the opposite partition wall OS is formed on the passivation layer PS. The opposite partition wall OS may have a substantially same structure as the partition wall 214 of the first substrate 212, and may face to the partition wall 214.

The fluidic layer 231 includes a first fluid 232, a second fluid 234 and a third fluid 236. The second fluid 234 may be electrolyte filled between the first substrate 212 and the second substrate 222.

The first fluid 232 is disposed in a space formed by the opposite partition wall OS, and makes contact with the passivation layer PS. The first fluid 232 may have specific gravity greater than the second fluid 234, and may be a hydrophobic oil. The first fluid 232 may be a colored oil capable of absorbing light. For example, the first fluid 232 may be a black oil. The first fluid 232 substantially blocks incident light, and forms a barrier structure.

The third fluid 236 is disposed in a space formed by the partition wall 214, and makes contact with the water-repellent layer 212. The third fluid 236 may have specific gravity greater than the second fluid 234, and may be an oil having including reflecting material. For example, the reflective material may be a metal particle, etc. The third fluid 236 may reflect incident light provided from the light providing unit 300 towards the light providing unit 300, which may be provided to the parallax barrier panel 202. Reflected light provided to the parallax barrier panel 202 may improve a light efficiency of the light providing unit 300.

The first and third fluids 232 and 236 may spread or concentrated at an opposite partition wall OS according to the voltage applied to the first electrode parts E1 and the second electrode part E2. The first fluid 232 may be controlled in substantially the same manner as the third fluid 236. The movements of the first and third fluids 232 and 236 may form barrier structures by a substantially same principle as that described with reference to FIG. 2A and FIG. 5. In addition, the first and third fluid 232 and 236 may be position-tracked by a substantially same principle as described with reference to FIGS. 6A to 6E. Thus, any repetitive explanation thereof will be omitted.

The parallax barrier panel 202 may be disposed on the display panel 100. In addition, the third electrode part E3 and the insulating layer 213 described with reference to FIG. 8 may be applied to the structure of the parallax barrier panel 202 so that both the horizontal display mode and the vertical display mode may be embodied in the 3D stereoscopic mode. The third electrode part E3 may be formed on the first base substrate SB1.

As described above, the fluid layer 231 further includes the third fluid 236, which may be a reflective type oil, and the light efficiency of the light providing unit 300 may be improved.

According to exemplary embodiments of the present invention, a parallax barrier structure used in the 3-dimensional (3D) stereoscopic image mode may be embodied using an electro wetting device. In the 2-dimensional (2D) image mode, a voltage applied to one of two notch electrodes is 0V, and a voltage applied to a main electrode and another of the two notch electrodes is a maximum voltage, so that the 2D image may be displayed.

In addition, a light transmitting area and a light blocking area the parallax barrier panel according to exemplary embodiments of the present invention may be formed based on the movement of the fluid of the fluidic layer. Thus, the parallax barrier panel according to exemplary embodiments of the present invention may position-track according to a viewpoint of a viewer.

The foregoing is illustrative of exemplary embodiments of the present invention and is not to be construed as limiting thereof. Although exemplary embodiments of the present invention have been described, those skilled in the art will readily appreciate that many modifications are possible without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments of the present invention and is not to be construed as limited to exemplary embodiments disclosed herein, and that modifications to disclosed exemplary embodiments, as well as other exemplary embodiments, are intended to be included within the scope of the appended claims.

What is claimed is:

1. A parallax barrier panel comprising:
   a first substrate comprising a plurality of first electrode parts, a water-repellent layer and a partition wall, each of the first electrode parts including a main electrode, a first notch electrode and a second notch electrode, the main electrode extending in a first direction on a first base substrate, the first and second notch electrodes being adjacent to respective ends of the main electrode, the first and second notch electrodes extending along the main electrode in the first direction, the water-repellent layer being disposed on the first electrode parts, the partition wall being disposed on the water-repellent layer;
   a second substrate comprising a second electrode part and a second base substrate, the second electrode part being disposed on the second base substrate, the second base substrate disposed opposite to the first base substrate; and
   a fluidic layer disposed between the first substrate and the second substrate, the fluidic layer controlling a light transmittance according to a voltage difference between the first electrode parts and the second electrode part,
   wherein the second substrate further comprises:
   a passivation layer disposed on the second electrode part; and an opposite partition wall disposed on the passivation layer, the opposite partition wall disposed corresponding to the partition wall, wherein the fluidic layer comprises:

a first fluid disposed in a space divided by the partition wall, the first fluid making contact with the water-repellent layer;

a second fluid filled between the first substrate and the second substrate, the second fluid having a specific gravity different from the first fluid; and a third fluid disposed in an opposite space divided by the opposite partition wall, the third fluid making contact with the passivation layer and the second fluid.

2. The parallax barrier panel of claim 1, wherein the first substrate further comprises a plurality of third electrode parts insulated from the first electrode parts and disposed between the first base substrate and the first electrode parts, each third electrode part including a crossing electrode, a third notch electrode and a fourth notch electrode, the crossing electrodes extending in a second direction different from the first direction, the third and fourth notch electrodes being adjacent to respective ends of the crossing electrode respectively, the third and fourth notch electrodes extending along the crossing electrode in the second direction.

3. The parallax barrier panel of claim 2, wherein a width of the crossing electrode is greater than or substantially equal to a width of the main electrode.

4. The parallax barrier panel of claim 1, wherein the first fluid is a reflective oil for reflecting incident light, and the third fluid is an absorbing oil for absorbing the incident light.

5. The parallax barrier panel of claim 1, wherein a plurality of signals are applied to the main electrode, the first notch electrode and the second notch electrode, respectively.

6. The parallax barrier panel of claim 1, further comprising a barrier structure formed of the fluidic layer.

7. The parallax barrier panel of claim 1, wherein the partition wall extends in the first direction, and includes a plurality of opening parts arranged in a second direction different from the first direction, and the first electrode parts correspond to the opening parts, respectively.

8. The parallax barrier panel of claim 1, wherein the partition wall includes a plurality of opening parts arranged in the first direction and a second direction different from the first direction, and each first electrode part corresponding to a group of the opening parts arranged in the first direction.

9. A display apparatus comprising:

a display panel displaying an image; and a parallax barrier panel comprising;

a first substrate including a plurality of first electrode parts, a water-repellent layer and a partition wall, each of the first electrode parts including a main electrode extended in a first direction on a first base substrate, and a first notch electrode and a second notch electrode disposed adjacent to respective ends of the main electrode and extending along the main electrode in the first direction, the water-repellent layer disposed on the first electrode parts, the partition wall formed on the water-repellent layer, a second substrate facing the first substrate, the second substrate including a second electrode part; and a fluidic layer disposed between the first substrate and the second substrate, the fluidic layer controlling a light transmittance according a voltage difference between the first electrode parts and the second electrode part, wherein the second substrate further comprises:

a passivation layer formed on the second electrode part; and an opposite partition wall formed on the passivation layer and corresponding to the partition wall, wherein the fluidic layer comprises:

a first fluid disposed in a space formed by the partition wall, the first fluid making contact with the water-repellent layer;

a second fluid filled between the first substrate and the second substrate, the second fluid having specific gravity different from the first fluid; and a third fluid disposed in an opposite space divided by the opposite partition wall, the third fluid making contact with the passivation layer and the second fluid.

10. The display apparatus of claim 9, wherein the first substrate further comprises:

a crossing electrode insulated from the first electrode parts, and disposed between the first electrode parts and the first base substrate, the crossing electrode being extended in a second direction different from the first direction; and a third notch electrode and a fourth notch electrode disposed adjacent to respective ends of the crossing electrode, the third and fourth notch electrodes extending in the second direction.

11. The display apparatus of claim 10, wherein each first electrode corresponds to at least one unit pixel arranged in the second direction of the display panel, the first electrode extending in the first direction, and each third electrode corresponding to one unit pixel arranged in the first direction, the third electrode extending in the second direction.

12. The display apparatus of claim 9, wherein the display panel includes a liquid crystal display panel, and the parallax barrier panel is disposed on or under the display panel.

13. The display apparatus of claim 9, wherein the display panel includes an electroluminescence display panel, and the parallax barrier panel is disposed on the display panel.

14. The display apparatus of claim 9, wherein the third fluid includes an absorbing oil in a space divided by the opposite partition wall, the absorbing oil making contact with the passivation layer, and wherein the first fluid includes a reflective oil.

15. The display apparatus of claim 14, further comprising a light providing unit providing light to the display panel, wherein the parallax barrier panel is disposed between the display panel and the light providing unit.

16. The display apparatus of claim 9, wherein the parallax barrier panel forms a barrier structure of the fluidic layer.

17. The display apparatus of claim 9, wherein the partition wall extends in the first direction, and includes a plurality opening parts arranged in a second direction crossing the first direction, and the first electrode parts correspond to the opening parts respectively.

* * * * *